US012570063B2

(12) United States Patent
Pujari et al.

(10) Patent No.: US 12,570,063 B2
(45) Date of Patent: Mar. 10, 2026

(54) MANDREL DEVICE FOR MANUFACTURING A SEGMENTED WIND TURBINE BLADE

(71) Applicant: LM WIND POWER A/S, Kolding (DK)

(72) Inventors: Pragneshbhai Pujari, Bengaluru (IN); Pavan Kumar, Bengaluru (IN); Madhusudhan Veerappa, Bengaluru (IN); Arulvelu Pandurangan, Bengaluru (IN)

(73) Assignee: LM Wind Power A/S, Kolding (DK)

( * ) Notice: Subject to any disclaimer, the term of this patent is extended or adjusted under 35 U.S.C. 154(b) by 77 days.

(21) Appl. No.: 18/686,277

(22) PCT Filed: Aug. 24, 2022

(86) PCT No.: PCT/EP2022/073570
§ 371 (c)(1),
(2) Date: Feb. 23, 2024

(87) PCT Pub. No.: WO2023/025844
PCT Pub. Date: Mar. 2, 2023

(65) Prior Publication Data
US 2024/0391199 A1 Nov. 28, 2024

(30) Foreign Application Priority Data
Aug. 25, 2021 (EP) .................................... 21192986

(51) Int. Cl.
*B29D 99/00* (2010.01)
*B29C 33/48* (2006.01)
*B29L 31/08* (2006.01)

(52) U.S. Cl.
CPC ........ *B29D 99/0028* (2013.01); *B29C 33/485* (2013.01); *B29L 2031/085* (2013.01)

(58) Field of Classification Search
None
See application file for complete search history.

(56) References Cited

U.S. PATENT DOCUMENTS 1,607,384 A * 11/1926 Ball ...................... B29C 33/485
249/186
3,754,717 A * 8/1973 Saidla ................... B29C 33/485
242/576.1

(Continued)

FOREIGN PATENT DOCUMENTS

CA 2942115 C * 2/2019 ........... B29C 70/342
EP 3925768 A1 * 12/2021 ........... F03D 1/0677

(Continued)

*Primary Examiner* — Emmanuel S Luk
(74) *Attorney, Agent, or Firm* — Dority & Manning, P.A.

(57) ABSTRACT

A mandrel device (50) for manufacturing a hollow spar beam (30) for a segmented wind turbine blade (10) in a mould (100), the mandrel device comprising:
a plurality of mandrel elements (52, 53, 54, 55, 56, 57, 58, 59) each comprising a substantially rigid material, and
a plurality of attachment devices (60) configured for detachably attaching adjacent mandrel elements,
wherein the mandrel device has an assembled configuration and a detached configuration, wherein:
in the assembled configuration, the plurality of attachment devices is engaged so that the plurality of mandrel elements is detachably attached to each other, and the plurality of mandrel elements extends along a longitudinal axis of the mandrel device so that the mandrel device has a substantially box shaped cross-section that varies along the longitudinal axis, and
in the detached configuration, the plurality of attachment devices is disengaged so that the plurality of mandrel elements is detached from each other, and the plurality of mandrel elements is inwardly collapsible.

14 Claims, 7 Drawing Sheets

(56)                    References Cited

U.S. PATENT DOCUMENTS

| | | | | |
|---|---|---|---|---|
| 4,456,214 | A * | 6/1984 | Ruck ................... | B29C 45/4421 |
| | | | | 249/59 |
| 4,919,608 | A * | 4/1990 | Catalanotti .......... | B29C 33/485 |
| | | | | 249/176 |
| 2010/0323051 | A1* | 12/2010 | Helenius ................ | F16B 21/04 |
| | | | | 425/161 |
| 2011/0211964 | A1* | 9/2011 | Bliss ................... | B21D 26/033 |
| | | | | 29/889.7 |
| 2011/0233837 | A1* | 9/2011 | Schibsbye ............ | B29C 70/446 |
| | | | | 269/20 |
| 2012/0299215 | A1* | 11/2012 | Piedmont ........... | B29C 37/0017 |
| | | | | 425/438 |
| 2013/0216388 | A1 | 8/2013 | Akhtar et al. | |
| 2016/0339661 | A1* | 11/2016 | Jones ................... | B64C 27/473 |
| 2017/0072598 | A1* | 3/2017 | Tessier ................. | B29C 33/485 |
| 2022/0017215 | A1* | 1/2022 | Dunn ................... | B29C 33/485 |
| 2023/0219316 | A1* | 7/2023 | Biegel ................. | F03D 1/0675 |
| | | | | 416/230 |

FOREIGN PATENT DOCUMENTS

| | | | | | |
|---|---|---|---|---|---|
| EP | 4241963 | A1 * | 3/2023 | ............ | B29C 70/32 |
| WO | 2015/116058 | A1 | 8/2015 | | |
| WO | 2020/122862 | A1 | 6/2020 | | |

* cited by examiner

66

64

60

60

63

61

62

63a

67

66a

66b

66

60

64

65

64

62

63

66a 53, 55, 57, 59

63a 52, 54, 56, 58

66

MANDREL DEVICE FOR MANUFACTURING A SEGMENTED WIND TURBINE BLADE

This is a National Phase Application filed under 35 U.S.C. 371 as a national stage of PCT/EP2022/073570, filed Aug. 24, 2022, an application claiming the benefit of European Application No. 21192986.4, filed Aug. 25, 2021, the content of each of which is hereby incorporated by reference in its entirety.

TECHNICAL FIELD

The present disclosure relates to a mandrel device for manufacturing a hollow spar beam of a segmented wind turbine blade in a mould, and a method of manufacturing a hollow spar beam of a segmented wind turbine blade in a mould.

BACKGROUND

In recent years, wind turbines for wind power generation have increased in size to achieve improvement in power generation efficiency and to increase the amount of power generation. Along with the increase in size of wind turbines for wind power generation, wind turbine blades have also increased in size. As such, various difficulties, such as a difficulty in integral manufacture and transportation difficulties, may occur in wind turbine blades.

One known strategy for reducing the complexity and costs associated with pre-forming, transporting, and erecting wind turbines having wind turbine blades of increasing sizes is to manufacture the wind turbine blades in blade segments. Such a wind turbine blade may be known as a segmented, sectional or pin-joined wind turbine blade. Two or more separate blade segments are manufactured and then transported disassembled to a site for assembly into a complete blade. This may result in an easier manufacturing process and may reduce the cost of transportation and erection of wind turbines.

Typically, the blade segments are joined by a male spar beam that extends span-wise from one blade segment into a female receiving section of the other blade segment. The male spar beam is often attached to the female receiving section via a pin joint. Such a male spar beam comprises two spar caps distanced by one or more shear webs and may often be a box-type male spar beam, i.e. with two shear webs connecting corresponding edges of the spar caps to form a box-like cross-sectional shape.

Conventionally, the male spar beam is manufactured in a two-part mould comprising a lower mould part, an upper mould part, and a mandrel. Fibre material is laid up in a lower mould upon which the mandrel is positioned. Additional fibre material is placed on the mandrel and the upper mould part then arranged to close off the lower mould part. The fibre material is then infused and cured typically via a conventional vacuum assisted resin infusion process to form a male spar beam. The male spar beam is then removed from the mould and the mandrel is taken out from the male spar beam, thereby forming a hollow interior space of the male spar beam.

The mandrel is conventionally made of a monolithic metal piece, e.g. of steel or aluminium, which has the advantage of being relatively dimensionally stable but may be difficult to remove after infusion. Another option is to have an inflatable mandrel which can be collapsed after infusion. However, such an inflatable mandrel may deform during the moulding process leading to lower quality hollow spar beams. Alternatively, a foam mandrel may be used which can be deformed prior to removal from the mould typically using a separate vacuum bag, thereby easing the removal. However, such foam mandrels degrade after each moulding cycle and thus only yields hollow spar beams of sufficient quality during relatively few moulding cycles, such as around 30.

SUMMARY

On this background, it may be seen as an object of the present disclosure to provide a mandrel device for manufacturing a hollow spar beam for a segmented wind turbine blade in a mould mitigating at least some of the drawbacks of the prior art.

Another object of the present disclosure is to provide a method for manufacturing a hollow spar beam for a segmented wind turbine blade in a mould mitigating at least some of the drawbacks of the prior art.

One or more of these objects may be met by aspects of the present disclosure as described in the following.

A first aspect of the present disclosure relates to a mandrel device for manufacturing a hollow spar beam, such as a male spar beam, for a segmented wind turbine blade in a mould, e.g. a female mould, the mandrel device comprising:

a plurality of mandrel elements each comprising, or preferably consisting essentially of, a substantially rigid material, and a plurality of attachment devices configured for detachably attaching adjacent mandrel elements, wherein the mandrel device has an assembled configuration and a detached configuration, wherein:

in the assembled configuration, the plurality of attachment devices is engaged so that the plurality of mandrel elements is detachably attached to each other, and the plurality of mandrel elements extends along a longitudinal axis of the mandrel device so that the mandrel device has a cross-section that preferably varies along the longitudinal axis and preferably surrounds an interior space that may extend along the longitudinal axis of the mandrel device, and in the detached configuration, the plurality of attachment devices is disengaged so that the plurality of mandrel elements is detached from each other, and the plurality of mandrel elements is inwardly collapsible preferably towards the interior space.

Such a mandrel device may provide the advantage of substantially increasing the number of times the mandrel device can be used in a method of manufacturing a hollow spar beam before replacement of the mandrel device is required. In some embodiments, the number of moulding cycles can be increased five times when compared to a conventional foam mandrel. Further, since degradation of mandrel device is significantly reduced, the quality of moulded hollow spar beams is increased, e.g. no critical moulding defects, which reduces the need for quality inspections. The aerodynamic profile of a wind turbine blade varies along a longitudinal axis of the wind turbine blade including in regions adjacent to the joint of a segmented wind turbine blade. The change of aerodynamic profile is typically more complex than a simple down-scaling of the aerodynamic profile along the longitudinal axis since different aerodynamic properties are required in different regions of the wind turbine blade. Wind turbine blades can also include a pre-bend and a twisting course which further complicates the change of aerodynamic profile. Therefore, the cross-section of the mandrel device may advantageously vary along its longitudinal axis and may include twisting and/or the longitudinal axis of the mandrel device may follow a bent course. The cross-section of the mandrel device may advantageously surround or circumscribe an interior space. Providing the mandrel device in this way may allow the cross-section of the mandrel device to accommodate complex changes in cross-section while still allowing the mandrel elements to be withdrawn in the detached configuration.

In the context of the present disclosure, a mandrel element comprising a substantially rigid material is understood as a mandrel element that is incompressible to practical engineering tolerances during the pressure encountered in the method of manufacturing the hollow spar beam. This contrasts with prior art mandrels made of a foam material that allows the mandrel to be compressed in order to withdraw the mandrel from the mould after layup of the fibre material and further contrasts with other prior art mandrels comprising inflatable portions which can be deflated in order to withdraw the mandrel. Such rigid mandrel elements may be provided by forming the mandrel elements of a composite material, e.g. fibre-reinforced plastic material, a sandwich-structured fibre-reinforced plastic material, and/or a metal.

Additionally or alternatively, the material of the mandrel elements and the material of the attachment devices may preferably have a thermal stability higher than the curing temperature of manufacturing method. In particular, the material of the mandrel elements and the material of the attachment devices may preferably thermally stable at a temperature of 80° C., preferably 100° C., or more preferably 120° C. This may achieve a higher number of moulding cycles since the temperature reached during curing of the hollow spar beam can typically around 80° C.

Additionally or alternatively, the substantially rigid material of the plurality of mandrel elements may be a metal, e.g. steel or aluminium, a polymer, e.g. polycarbonate, or a fibre-reinforced plastic material. The substantially rigid material of the plurality of mandrel elements may preferably be fibre-reinforced plastic material, e.g. a carbon fibre-reinforced plastic material. Alternatively, the substantially rigid material of the plurality of mandrel elements may preferably be a sandwich-structured fibre-reinforced plastic material, more preferably a sandwich-structured carbon fibre-reinforced plastic material. Preferably, each mandrel element is manufactured in a single piece.

Such mandrel elements may provide the advantage of reducing the weight of the individual mandrel elements so that these can be withdrawn individually from the mould by a single operator. Furthermore, such mandrel elements may be provided light enough to allow the entire mandrel device in the assembled configuration to be handled by fewer operators. In a preferred embodiment, the plurality of mandrel elements comprises or consists essentially of a sandwich-structured fibre-reinforced plastic material. Such mandrel elements may bring the weight of the mandrel device below 10 kg per metre, e.g. less than 8 kg per metre, which may allow a five-metre mandrel device to weigh less than 40 kg allowing handling of the mandrel device by two operators.

Additionally or alternatively, the plurality of mandrel elements may extend in parallel along the longitudinal axis and may preferably extend in the full length of the mandrel device in the assembled configuration.

The plurality of mandrel elements extending in parallel and in particular extending in the full length of the mandrel device may provide the advantage of a particularly easy arrangement to withdraw from the mould since an operator can get a hold of each individual mandrel element in the mould and withdraw them one at a time from the mould.

Additionally or alternatively, the plurality of mandrel elements may comprise at least two mandrel elements, preferably at least four mandrel elements, or more preferably at least six mandrel elements, or even more preferably eight mandrel elements.

Having at least two mandrel elements may provide the advantage of allowing the mandrel device to assume complex shape with increased variation in cross-section along the longitudinal axis while still allowing the mandrel elements to be withdrawn from the mould. Furthermore, by dividing the mandrel device in more mandrel elements, lower weight for each mandrel element can be achieved and a more complex shape of the mandrel device can be achieved. This is especially useful for allowing the individual mandrel elements to be handled by fewer operators, e.g. a single operator.

Additionally or alternatively, the plurality of mandrel elements may comprise two or more, preferably four, corner mandrel elements each defining a cross-sectional corner of the mandrel device in the assembled configuration and wherein joining lines between the plurality of mandrel elements are distanced from the cross-sectional corners of the mandrel device in the assembled configuration.

By forming each corner of the mandrel device in the assembled configuration by a single corner mandrel element, good dimensional accuracy of the corners of the mandrel device may be ensured and thus moulding defects of the hollow spar beam can be reduced or even eliminated.

Additionally or alternatively, the plurality of mandrel elements may comprise at least two, preferably four, side mandrel elements each defining a side of the mandrel device in the assembled configuration, wherein each side mandrel comprises a ledge, preferably oriented in the longitudinal direction, resting on an adjacent, corresponding mandrel elements in the assembled configuration so that the side mandrel elements are prevented from being moved outwardly and so that, upon disengaging the attachment devices, the side mandrel elements are inwardly collapsible towards an interior space of the mandrel device.

Such side mandrel elements may provide the advantage of a mandrel device which robustly defines the outer surface thereof to ensure increased dimensional accuracy when moulding the hollow spar beam. Further, by providing the side mandrels with a ledge, it can be ensured that the mandrel device is inwardly collapsible towards the interior space of the mandrel device. This may aid withdrawal of the mandrel elements from the mould while reducing the risk of the mandrel elements from unintentionally scraping the hollow spar beam.

Additionally or alternatively, each attachment device may comprise an electromagnetic element and a ferromagnetic element, wherein the electromagnetic element is fixed to a mandrel element and the ferromagnetic element is fixed to another, adjacent mandrel element, wherein, in the assembled configuration, the electromagnetic element of each attachment device is engaged to attract the corresponding ferromagnetic element so that corresponding mandrel elements are attached to each other, and, in the detached configuration, the electromagnetic element of each attachment device is disengaged so that the plurality of mandrel elements is inwardly collapsible towards an interior space of the mandrel device.

Such attachment devices may provide the advantage of quick and easy engagement and disengagement of the attachment devices. Furthermore, all attachment devices may be engaged and disengaged simultaneously which can ease the switch between the assembled and detached configurations.

Additionally, the mandrel device may comprise a plurality of cables each electrically connected to a corresponding electromagnetic element of the plurality of attachment devices, wherein each cable comprises a cable portion being embedded in the corresponding mandrel element.

By embedding a cable portion, the cables may be protected from damage when collapsing the mandrel device.

Additionally or alternatively, the mandrel device may comprise a control unit in communication with the plurality of attachment devices, preferably via the plurality of cables, and being configured for, in an attachment state, to cause the plurality of attachment devices to attach the mandrel elements to each other so as to bring the mandrel device in the assembled configuration, and configured for, in a detachment state, to cause the mandrel elements to detach from each other so as to bring the mandrel device in the detached configuration.

Additionally or alternatively, the cross-section of the mandrel device may be polygonal shaped, e.g. substantially rectangular shaped, preferably substantially box shaped. The cross-section of the mandrel device typically varies along the longitudinal axis and may twist along the longitudinal axis.

The longitudinal axis may be curved or straight. The interior space surrounded by the cross-section of the mandrel device may extend from end-to-end of the mandrel device.

A second aspect of the present disclosure relates to a method for manufacturing a hollow spar beam for a segmented wind turbine blade in a mould, e.g. a female mould, the method comprising the steps of:

providing a mould, such as a female mould, for the hollow spar beam, the mould extending along a longitudinal axis and comprising a mould surface including a floor face, a first side face, and a second side face;
  providing a mandrel device comprising:
    a plurality of mandrel elements extending along the longitudinal axis and each comprising, or preferably consisting essentially of, a substantially rigid material, and
    a plurality of attachment devices configured for detachably attaching adjacent mandrel elements,
  wherein the mandrel device has an assembled configuration and a detached configuration, and:
    in the assembled configuration, the plurality of attachment devices is engaged so that the plurality of mandrel elements is detachably attached to each other, and the plurality of mandrel elements extends along the longitudinal axis so that the mandrel device has a cross-section that preferably varies along the longitudinal axis and preferably surrounds an interior space that may extend along the longitudinal axis of the mandrel device, and
    in the detached configuration, the plurality of attachment devices is disengaged so that the plurality of mandrel elements is detached from each other, and the plurality of mandrel elements is inwardly collapsible preferably towards the interior space;
  arranging fibre material and optionally core material on the floor face and the side faces of the mould;
  assembling the mandrel device to the assembled configuration by attaching the plurality of mandrel elements to each other via the plurality of attachment devices;

arranging the mandrel device on the fibre material in the mould so that the fibre material and optionally core material is arranged between the mandrel device and the mould;
  covering the mandrel device with fibre material and optionally core material;
  preferably curing the fibre material in the mould with a resin;
  arranging the mandrel device in the detached configuration by detaching the plurality of mandrel elements from each other via the plurality of attachment devices; and
  withdrawing the detached plurality of mandrel elements from the mould.

This method may provide the advantage of substantially increasing the number of times the method can be performed before replacement of the mandrel device is required. In some embodiments, the number of moulding cycles can be increased five times when compared to methods using a conventional foam mandrel. Further, since degradation of mandrel device is significantly reduced, the quality of moulded hollow spar beams is increased, e.g. no critical moulding defects, which reduces the need for quality inspections.

Additionally, the method may comprise a step of arranging a vacuum bag at the fibre material to seal the fibre material to the mould and create a moulding space occupied by the fibre material for subsequent evacuation. The moulding space may be connected to a vacuum source and air within the moulding space may be evacuated. Accordingly, the step of withdrawing the detached plurality of mandrel elements from the mould may then be performed prior to the step of infusing and curing the fibre material in the mould with the resin since the vacuum bag fixates the fibre material against the mould and mould lid. This may have the advantage that the mandrel device can be used in a second mould while the hollow spar beam is being manufactured.

Additionally or alternatively, the fibre material may be at least one fibre layers, e.g. comprising glass or carbon fibres. Additionally, the fibre material may comprise unidirectional fibre, biaxial fibres, and/or triaxial fibres.

Additionally or alternatively, the fibre material may be arranged as skin layers around the core material to from a sandwich structure. Thus, the core material separates the skin layers from each other. The core material may be made of balsawood, foamed plastic material, or a honeycomb.

Accordingly, the step of arranging fibre material and optionally core material may comprise arranging the fibre material and core material to from a sandwich structure.

Additionally or alternatively, the step of withdrawing the mandrel elements from the mould may comprise withdrawing the side mandrel elements and then withdrawing the corner mandrel elements. This may allow the corner mandrel elements to have a larger cross-sectional extent and/or a more complex shape to achieve stronger cross-sectional corners of the mandrel device. Additionally, the order of withdrawal of the side mandrel elements may be first the top side mandrel element, then the bottom side mandrel element and then the left and right side mandrel elements.

Additionally or alternatively, the plurality of mandrel elements may comprise or consist essentially of a fibre-reinforced plastic material, preferably a sandwich-structured fibre-reinforced plastic material.

Such mandrel elements may provide the advantage of reducing the weight of the individual mandrel elements so that these can be withdrawn individually from the mould by a single operator. Furthermore, such mandrel elements may be provided light enough to allow the mandrel device in the assembled configuration to be handled by fewer operators. In a preferred embodiment, the plurality of mandrel elements comprises or consists essentially of a sandwich-structured fibre-reinforced plastic material. Such mandrel elements may reduce the weight of the mandrel below 10 kg per metre, e.g. less than 8 kg per metre. This may allow a five-metre mandrel device to weigh less than 40 kg allowing handling of the mandrel device by two operators or even a single operator without the assistance of a lift.

Additionally or alternatively, the step of detaching the plurality of mandrel elements from each other may be performed by operating a control unit to cause the plurality of attachment devices to detach so as to bring the mandrel device to its detached configuration.

This may provide the advantage of allowing an operator to easily bring the mandrel device to its detached configuration in order to allow withdrawal of the mandrel elements from the mould.

Additionally or alternatively, the step of assembling the mandrel device to the assembled configuration may be performed prior to the step of arranging the mandrel device on the fibre material in the mould.

This may provide the advantage of saving mould time since assembly of mandrel device can be performed simultaneously with preparatory steps of arranging fibre material and optionally core material on the mould floor surface and the mould side surfaces of the mould.

Additionally or alternatively, the method may further comprise a step of arranging a mould lid on the mould so as to fully enclose the fibre material within the mould and mould lid.

Additionally, the step of providing the mandrel device may include providing a mandrel device according to the first aspect.

A third aspect of this disclosure relates to the use of a mandrel device according to the first aspect of this disclosure in a method according to the second aspect of this disclosure.

A person skilled in the art will appreciate that any one or more of the above aspects of this disclosure and embodiments thereof may be combined with any one or more of the other aspects of this disclosure and embodiments thereof.

BRIEF DESCRIPTION OF THE DRAWINGS

Embodiments of this disclosure will be described in more detail in the following with regard to the accompanying figures. The figures show one way of implementing the present invention and are not to be construed as being limiting to other possible embodiments falling within the scope of the attached claim set.

DETAILED DESCRIPTION OF THE INVENTION

In the following figure description, the same reference numbers refer to the same elements and thus may not be described in relation to all figures.

Figure 1:
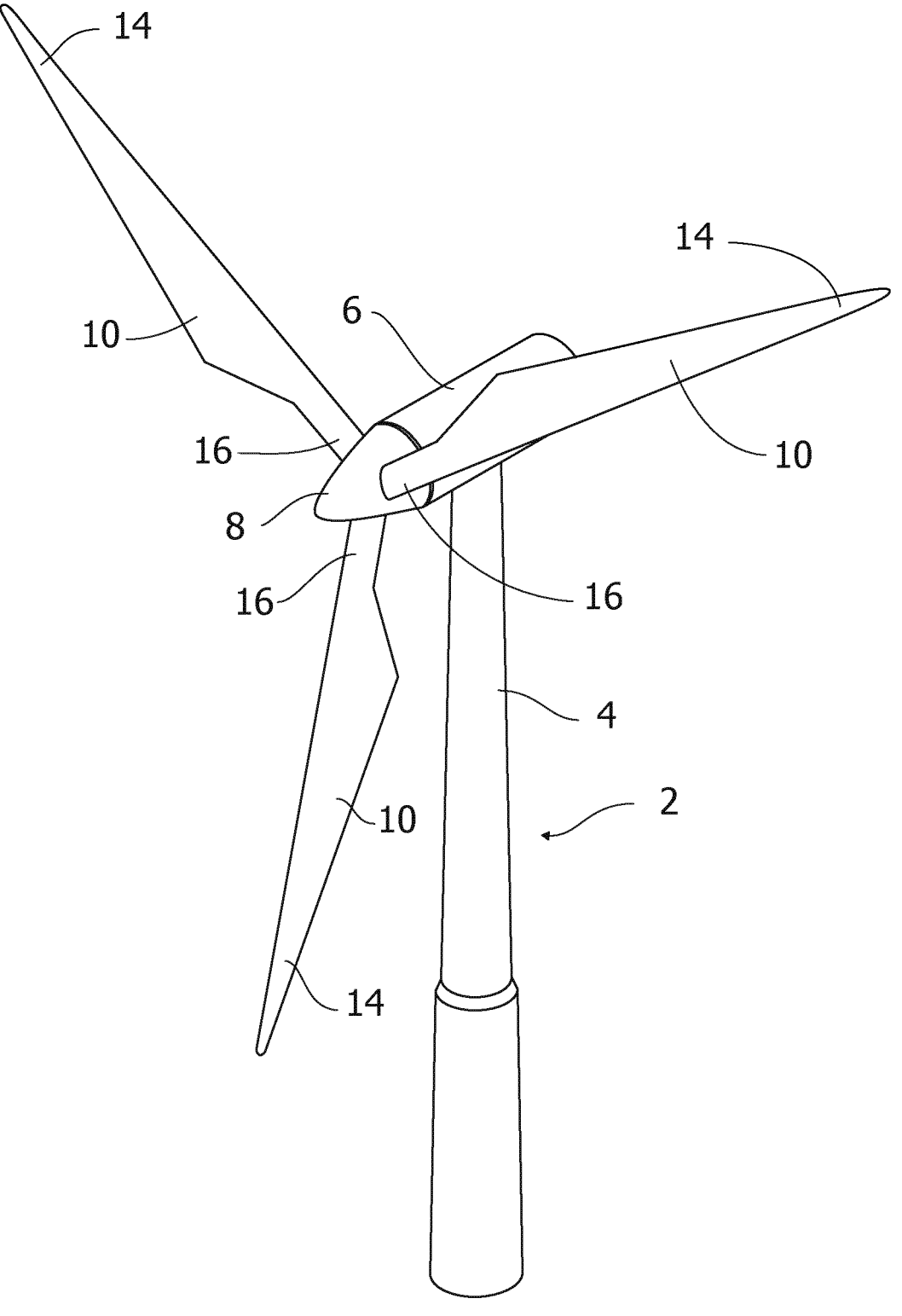
FIG. 1 is a schematic perspective view of a wind turbine.

FIG. 1 illustrates a conventional modern upwind wind turbine 2 according to the so-called "Danish concept" with a tower 4, a nacelle 6 and a rotor with a substantially horizontal rotor shaft. The rotor includes a hub 8 and three blades 10 extending radially from the hub 8, each having a blade root 16 nearest the hub and a blade tip 14 farthest from the hub 8.

Figure 2:
FIG. 2 is a schematic perspective view of a wind turbine blade for a wind turbine as shown in FIG. 1.

FIG. 2 shows a schematic view of a wind turbine blade 10. The wind turbine blade 10 has the shape of a conventional wind turbine blade and comprises a root region 12 closest to the hub, a profiled or an airfoil region 11 farthest away from the hub and a transition region 13 between the root region 12 and the airfoil region 11. The blade 10 comprises a leading edge 18 facing the direction of rotation of the blade 10, when the blade is mounted on the hub, and a trailing edge 20 facing the opposite direction of the leading edge 18. The outermost point of the blade 10 is the tip end 15.

The airfoil region 11 (also called the profiled region) has an ideal or almost ideal blade shape with respect to generating lift, whereas the root region 12 due to structural considerations has a substantially circular or elliptical cross-section, which for instance makes it easier and safer to mount the blade 10 to the hub. The diameter (or the chord) of the root region 12 may be constant along the entire root area. The transition region 13 has a transitional profile gradually changing from the circular or elliptical shape of the root region 12 to the airfoil profile of the airfoil region 11. The chord length of the transition region 13 typically increases with increasing distance r from the hub. The airfoil region 11 has an airfoil profile with a chord extending between the leading edge 18 and the trailing edge 20 of the blade 10. The width of the chord decreases with increasing distance r from the hub 8.

A shoulder 26 of the blade 10 is defined as the position where the blade 10 has its largest chord length. The shoulder 26 is typically provided at the boundary between the transition region 13 and the airfoil region 11. The outermost third of the airfoil region 11 is typically referred to as the tip region 11'. FIG. 2 also illustrates the longitudinal direction L defining longitudinal extent of the blade.

Figure 3A:
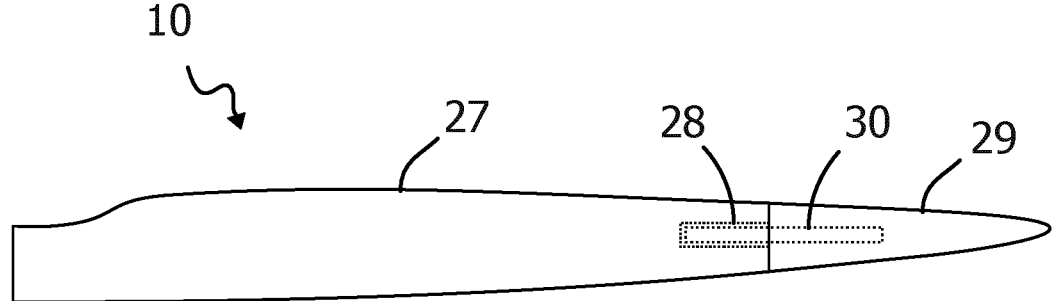
FIG. 3a is a schematic side view of a segmented wind turbine blade.

FIG. 3a schematically illustrates a segmented wind turbine blade 10. It is made up at least of a root segment 27 and a tip segment 29 divided at a chordwise joint. To allow joining of the root segment 27 with the tip segment 29, the two segments 27, 29 may comprise a female receiving section 28 and a mating hollow spar beam 30 in the form of a male spar beam. The male spar beam 30 is inserted into and engaging with the female receiving section 28. The female receiving section 28 and the male spar beam 30 are fixed together via a locking arrangement (not shown) at the chordwise joint with a pin.

Figure 3B:
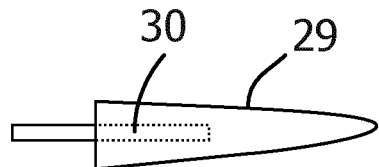
FIG. 3b is a schematic view of a tip segment for a segmented wind turbine blade.

FIG. 3*b* illustrates the tip segment 29 of the segmented blade 10 shown in the previous figures. Aside from the shell that forms the aerodynamic profile of the blade 10, the tip segment 29 further comprises the male spar beam 30 as described above. The male spar beam 30 of the tip segment protrudes beyond (outside) the tip segment shell at the chordwise joint to allow the male spar beam to engage with a corresponding female receiving section 28 arranged in the root segment 27.

Figure 3C:
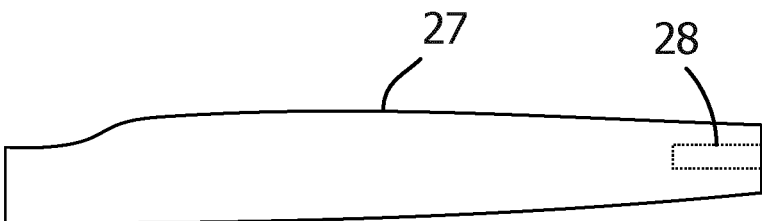
FIG. 3c is a schematic view of a root segment for a segmented wind turbine blade.

FIG. 3*c* illustrates the root segment 27 of the segmented blade 10. As described above, the root segment 27 comprises a female receiving section 28 for receiving the male spar beam 30 of the tip segment 29 in order to allow the root segment 27 and the tip segment 29 to be securely joined together. The final blade is obtained by mating the male spar beam 30 with the female receiving section 28, securing the two together at the chordwise joint, sealing the region where the blade segments 27, 29 meet, and providing any finishing touches to the blade.

Figure 4:
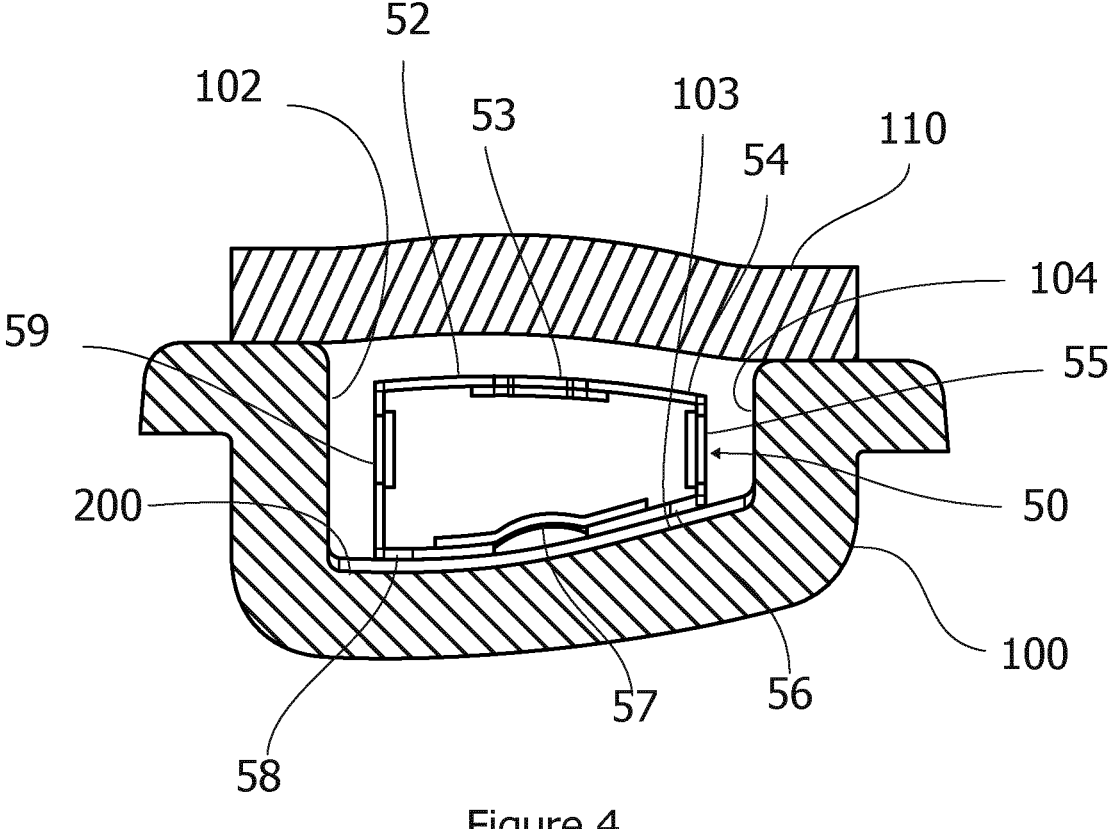
FIG. 4 is a schematic cross-sectional view of an arrangement for manufacturing a hollow spar beam using a mandrel device.

Turning to FIG. 4, an arrangement for manufacturing such a male spar beam is shown. First, a female mould 100. The female mould 100 extends along a longitudinal axis L and comprises a mould surface including a floor face 103, a first side face 102, and a second side face 104. Then fibre material 200 and optionally core material (not shown) is arranged on the floor face 104 and on the side faces 102, 104 of the female mould 100 to partially build up the layer arrangement of the male spar beam. Two operators place a mandrel device 50 in its assembled configuration onto the fibre material 200 and the optional core material already in the female mould 100. The mandrel device 50 is also typically wrapped in a vacuum bag to prevent resin from adhering to the mandrel device 50. The mandrel device 50 comprises eight mandrel elements 52, 53, 54, 55, 56, 57, 58, 59 extending in parallel along the longitudinal axis L along the full length of the mandrel device 50 so as to form a substantially box-shaped cross-section that varies along the longitudinal axis. Each mandrel element 52, 53, 54, 55, 56, 57, 58, 59 consists essentially of a substantially rigid material in the form of a sandwich-structured carbon fibre-reinforced plastic material. The mandrel elements 52, 53, 54, 55, 56, 57, 58, 59 are described in more detail in the following figures. The mandrel device 50 further comprises a plurality of attachment devices configured for detachably attaching adjacent mandrel elements 52, 53, 54, 55, 56, 57, 58, 59. The attachment devices are shown in greater detail in FIGS. 6 and 7A-7C. Further, fibre material and optionally core material (not shown) is then placed on top to cover the mandrel device 50 and the female mould 100 is closed by a cover lid 110 so as to enclose a moulding space in which the fibre material 200 and the optional core material are arranged. The moulding space is then evacuated and the fibre material 200 and the optional core material are infused and cured to form the male spar beam. The mandrel device 50 set to its detached configuration (more details in relation to FIG. 5*b*) and the mandrel elements 52, 53, 54, 55, 56, 57, 58, 59 are withdrawn from an end of the female mould 100 one-by-one by a single operator. First, the four side mandrel elements 53, 55, 57, 59 are withdrawn in the order of the top side mandrel element 53, the bottom side mandrel element 57, and then the right and left side mandrel element 55, 59. After the side mandrel elements 53, 55, 57, 59 are withdrawn, the corner mandrel elements 52, 54, 56, 58 can be withdrawn one-by-one from the female mould 100. The mandrel elements 52, 53, 54, 55, 56, 57, 58, 59 can either be withdrawn after curing or between evacuation of the moulding space and infusion.

Figure 5A:
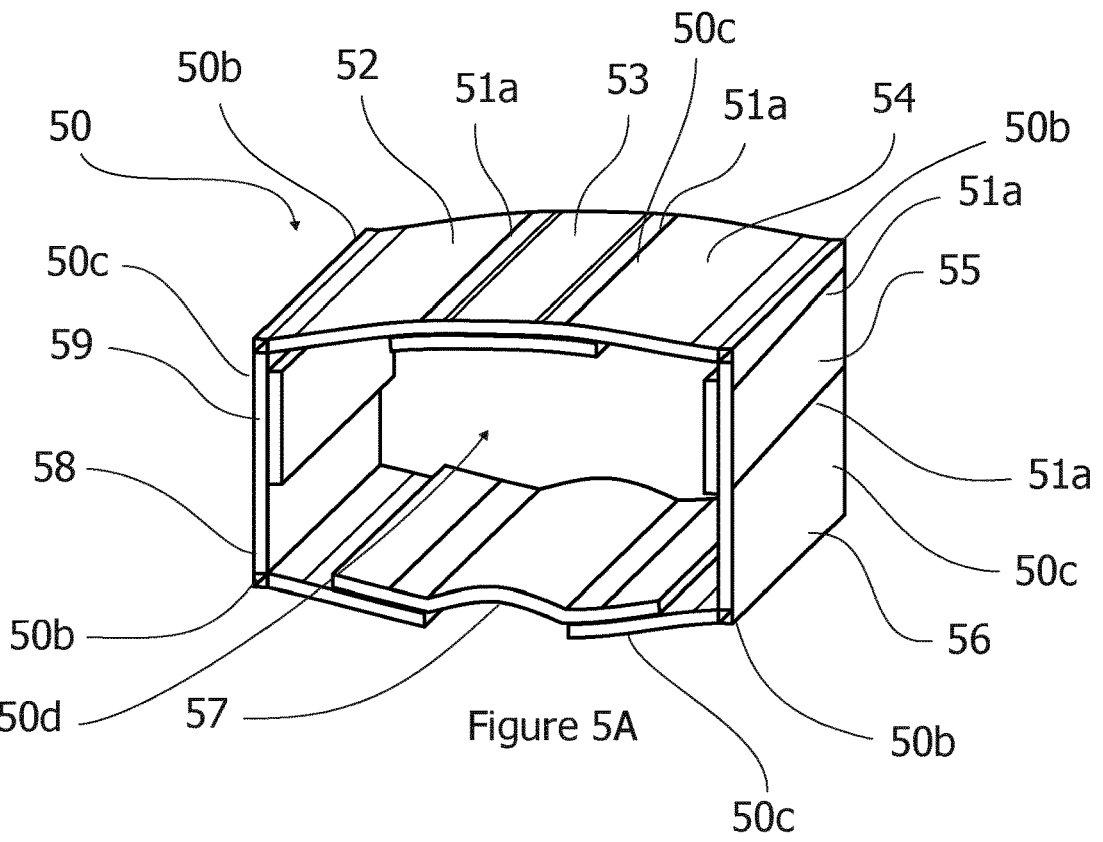
FIG. 5A is a schematic perspective view of a longitudinal slice of a mandrel device in its assembled configuration.
Figure 5B:
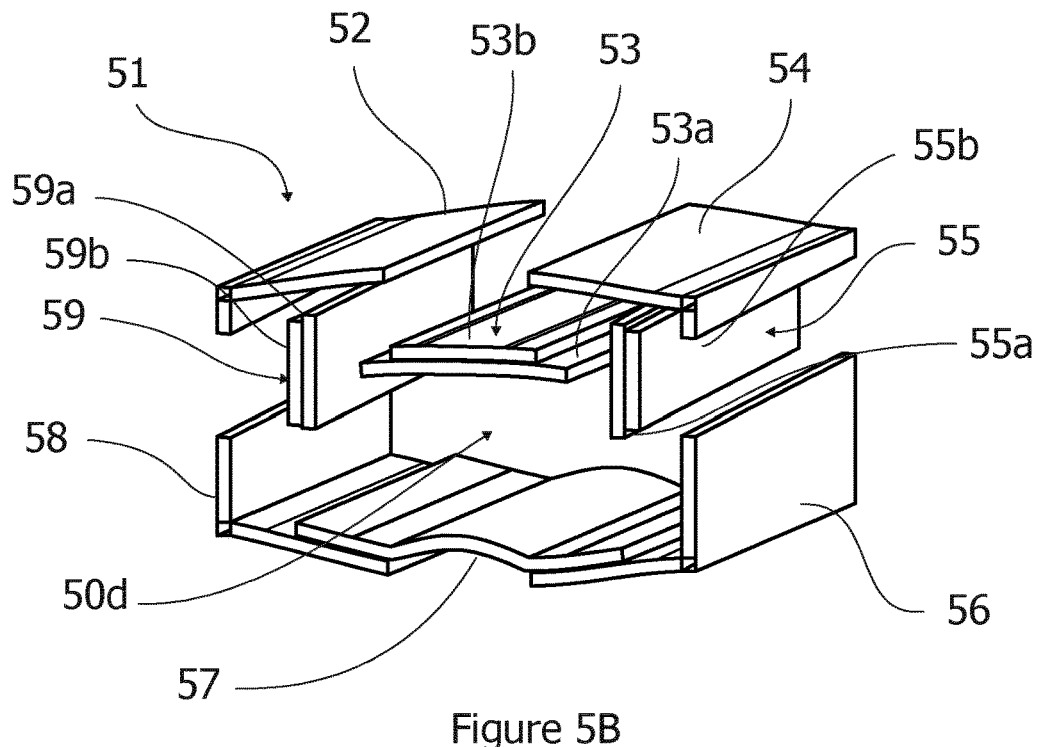
FIG. 5B is a schematic perspective view of a longitudinal slice of a mandrel device in its detached configuration.

Turning to FIGS. 5A-5B, the mandrel device 50 is shown in greater detail. The mandrel device 50 has an assembled configuration as shown in FIG. 5A and a detached configuration as shown in FIG. 5B. In this case, the mandrel elements 52, 53, 54, 55, 56, 57, 58, 59 consists of four corner mandrel elements 52, 54, 56, 58 and four side mandrel elements 53, 55, 57, 59. However, in other embodiments, there may be, for instance, four corner mandrel elements and no side mandrel elements or two corner mandrel elements and two side mandrel elements. The corner mandrel elements each define a cross-sectional corner 50*b* of the mandrel device 50 in the assembled configuration as shown in FIG. 5A. The side mandrel elements each defines a side 50*c* of the mandrel device 50 in the assembled configuration. Joining lines 51*a* between the mandrel elements 52, 53, 54, 55, 56, 57, 58, 59 are distanced from the cross-sectional corners 50*b* of the mandrel device 50 in the assembled configuration to stiffen the cross-sectional corners 50*d* of the mandrel device 50. In the present embodiment, as best seen in FIG. 5B, the top side, right side, and left side mandrel elements 53, 55, 59 each comprises longitudinal ledges 53*a*, 55*a*, 59*a* adjacent to the respective corner mandrel elements. The longitudinal ledges 53*a*, 55*a*, 59*a* adjoin a ridge 53*b*, 55*b*, 59*b* of the respective side mandrel element. In the assembled configuration, as shown in FIG. 5A, the longitudinal ledges 53*a*, 55*a*, 59*a* rest on an inner surface of the adjacent corner mandrel element while the ridge is interposed between the two respective and adjacent corner mandrel elements to create a mechanically stable cross-section. The ridge and ledges further prevent the side mandrel elements from being moved outwardly and allows the side mandrel elements, in the detached configuration, to be inwardly collapsible towards an interior space 50*d* of the mandrel device 50. In the present embodiment, the bottom side mandrel element 57 does not comprise ledges and a ridge but instead defines an outer depression in the mandrel device 50 in its assembled configuration. A resin runner may be accommodated in this outer depression when the mandrel device 50 is placed in female mould 100.

Figure 6:
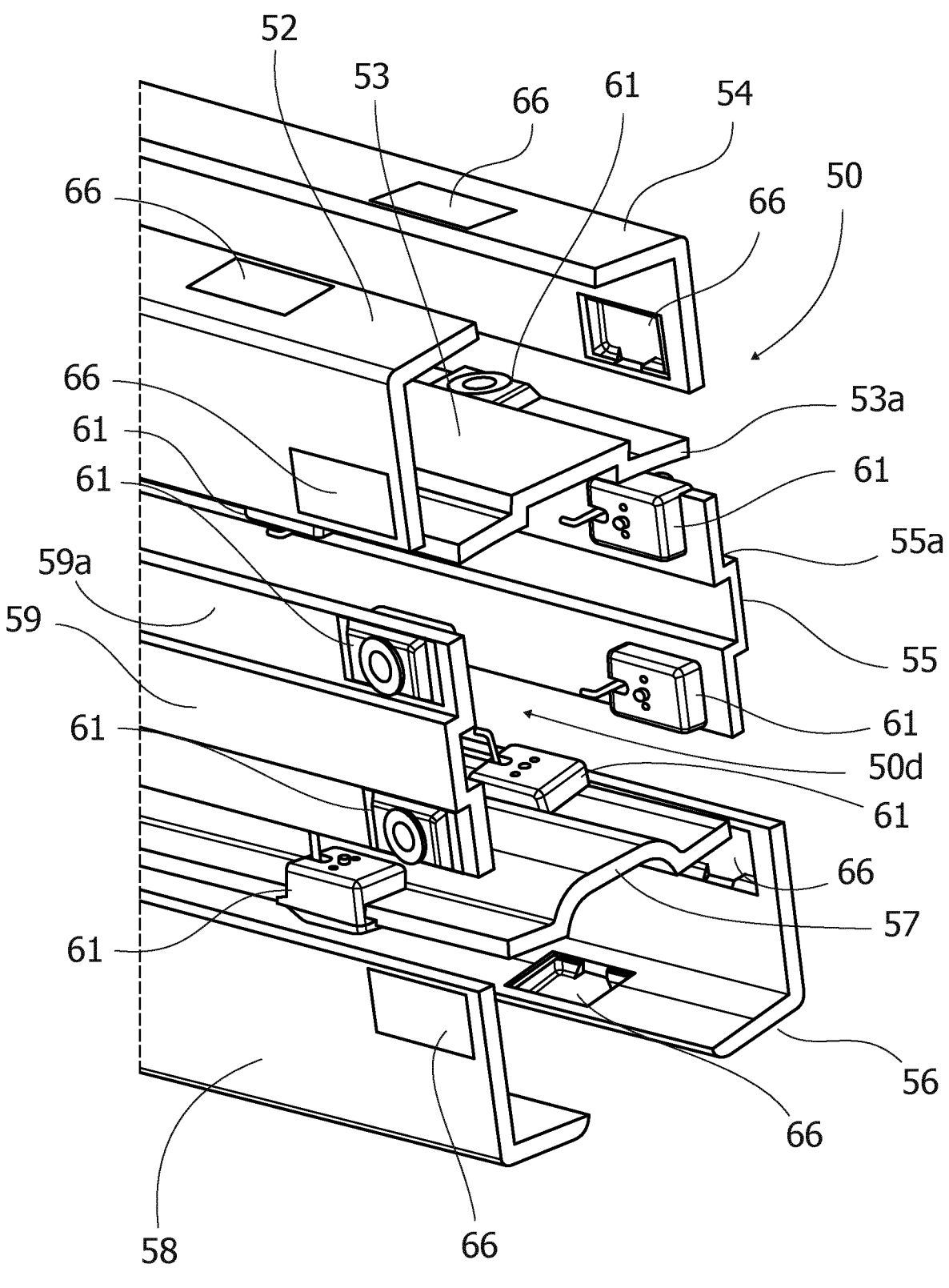
FIG. 6 is a schematic perspective view of a mandrel device in its detached configuration further illustrating a plurality of attachment devices.
Figures 7A, 7B, 7C:
FIG. 7A is a schematic perspective view of an attachment device.
FIG. 7B is a schematic exploded view of an attachment device.
FIG. 7C is a schematic cross-sectional view of an attachment device.

Turning to FIG. 6, the mandrel device 50 in its detached configuration and with a plurality of attachment devices is shown, whereas an individual attachment device 60 is shown in greater detail in FIGS. 7A-7C. Each attachment device 60 is configured for, in the assembled configuration, engaging so that the eight mandrel elements 52, 53, 54, 55, 56, 57, 58, 59 are detachably attached to each other, and, in the detached configuration, disengaging so that the eight mandrel elements 52, 53, 54, 55, 56, 57, 58, 59 are detached from each other to allow the mandrel elements to be inwardly collapsible towards the interior space 50*d* as shown in FIGS. 6 and 5B.

Turning specifically to FIGS. 7A-7C, the attachment devices of the present embodiment function as follows. Each attachment device 60 comprise an electromagnetic element 61 and a ferromagnetic element 66. The electromagnetic element 61 of each attachment device is fixed to a side mandrel element 53, 55, 57, 59 and the ferromagnetic element 66 is fixed to a corresponding, adjacent corner mandrel element 52, 54, 56, 58. The electromagnetic element 61 comprises an electromagnet 62 and a housing 63. The ferromagnetic element 66 is made of a ferromagnetic material, e.g. ferromagnetic iron alloy. The ferromagnetic element 66 comprises a sloping portion 66*a* and the housing 63 comprises a mating tapering portion 63*a*. The housing 63 comprises a fixing screw 65 for fixing the electromagnet 62 to the housing 63 and further height adjusting screws 64 for adjusting the position of electromagnet 62 within the housing 63 so that, when the electromagnet element 61 approaches the ferromagnetic element 66, the electromagnet 62 abuts a floor 66b of the ferromagnet element 66 simultaneously with the tapering portion 63a of the housing 63 engaging sloping portion 66a of the ferromagnetic element 66 to ensure a strong attachment force. Thus, in the assembled configuration, the electromagnetic element 61 of each attachment device 60 is engaged to attract the corresponding ferromagnetic element 66 so that corresponding mandrel elements are attached to each other. In the detached configuration, the electromagnetic element 62 of each attachment device 60 is disengaged so that the mandrel elements 52, 53, 54, 55, 56, 57, 58, 59 are inwardly collapsible. Each electromagnet 62 is electrically connected with a control unit (not shown) via cables 67. The control unit is configured for allowing an operator to cause the attachment devices 60 to switch between engagement and disengagement to allow switching the mandrel device 50 between the assembled and detached configurations. Each cable 67 comprises an embedded cable portion which extends from the corresponding electromagnetic element 61 to the control device and which is embedded in the corresponding mandrel element 52, 53, 54, 55, 56, 57, 58, 59.

| LIST OF REFERENCES | |
| --- | --- |
| 2 | wind turbine |
| 4 | tower |
| 6 | nacelle |
| 8 | hub |
| 10 | segmented wind turbine blade |
| 11 | airfoil region |
| 11' | tip region |
| 12 | root region |
| 13 | transition region |
| 14 | blade tip |
| 15 | tip end |
| 16 | blade root |
| 17 | root end |
| 18 | leading edge |
| 20 | trailing edge |
| 21 | chordwise joint |
| 22 | pressure side |
| 24 | suction side |
| 26 | shoulder |
| 27 | root segment |
| 28 | female receiving section |
| 29 | tip segment |
| 30 | hollow spar beam |
| 40 | upper spar cap |
| 46 | lower spar cap |
| 50 | mandrel device |
| 50b | cross-sectional corner |
| 50c | side |
| 50d | interior space |
| 51 | mandrel elements |
| 51a | joining line |
| 52 | top left corner mandrel element |
| 53 | top side mandrel element |
| 53a | ledge |
| 53b | ridge |
| 54 | top right corner mandrel element |
| 55 | right side mandrel element |
| 55a | ledge |
| 55b | ridge |
| 56 | bottom right corner mandrel element |
| 57 | bottom side mandrel element |
| 58 | bottom left corner mandrel element |
| 59 | left side mandrel element |
| 59a | ledge |
| 59b | ridge |

-continued

| LIST OF REFERENCES | |
| --- | --- |
| 60 | attachment device |
| 61 | electromagnetic element |
| 62 | electromagnet |
| 63 | housing |
| 63a | tapering portion |
| 64 | height adjusting screw |
| 65 | fixing screw |
| 66 | ferromagnetic element |
| 66a | sloping portion |
| 66b | floor |
| 67 | cable |
| 100 | female mould |
| 101 | mould surface |
| 102 | first side face |
| 103 | floor face |
| 104 | second side face |
| 110 | mould lid |
| 200 | fibre material |

The invention claimed is:

1. A mandrel device (50) for manufacturing a hollow spar beam (30) for a segmented wind turbine blade (10) in a mould (100), the mandrel device comprising:
a plurality of mandrel elements (52, 53, 54, 55, 56, 57, 58, 59) each comprising a substantially rigid material; and
a plurality of attachment devices (60) configured for detachably attaching adjacent mandrel elements,
wherein the mandrel device has an assembled configuration and a detached configuration, and wherein:
in the assembled configuration, the plurality of attachment devices is engaged so that the plurality of mandrel elements is detachably attached to each other, and the plurality of mandrel elements extends along a longitudinal axis of the mandrel device so that the mandrel device has a cross-section that surrounds an interior space (50d), and
in the detached configuration, the plurality of attachment devices is disengaged so that the plurality of mandrel elements is detached from each other, and the plurality of mandrel elements is inwardly collapsible towards the interior space.

2. The mandrel device according to claim 1, wherein the substantially rigid material of the plurality of mandrel elements is a fibre-reinforced plastic material.

3. The mandrel device according to claim 1, wherein the plurality of mandrel elements extends in parallel along the longitudinal axis.

4. The mandrel device according to claim 1, wherein the plurality of mandrel elements comprises at least four mandrel elements.

5. The mandrel device according to claim 1, wherein the plurality of mandrel elements comprises two or more corner mandrel elements (52, 54, 56, 58) each defining a cross-sectional corner (50b) of the mandrel device in the assembled configuration and wherein joining lines (51a) between the plurality of mandrel elements are distanced from the cross-sectional corners of the mandrel device in the assembled configuration.

6. The mandrel device according to claim 1, wherein the plurality of mandrel elements comprises at least two side mandrel elements (53, 55, 57, 59) each defining a side (50c) of the mandrel device in the assembled configuration, wherein each side mandrel comprises a ledge (53a, 55a, 57a, 59a) resting on adjacent, corresponding mandrel elements in the assembled configuration so that the side mandrel elements are prevented from being moved outwardly and so that, upon disengaging the attachment devices, the side mandrel elements are inwardly collapsible towards the interior space (50*d*) of the mandrel device.

7. The mandrel device according to claim 1, wherein each attachment device (60) comprises an electromagnetic element (61) and a ferromagnetic element (66), wherein the electromagnetic element is fixed to a mandrel element and the ferromagnetic element is fixed to another, adjacent mandrel element, wherein, in the assembled configuration, the electromagnetic element of each attachment device is engaged to attract the corresponding ferromagnetic element so that corresponding mandrel elements are attached to each other, and, in the detached configuration, the electromagnetic element of each attachment device is disengaged so that the plurality of mandrel elements is inwardly collapsible.

8. The mandrel device according to claim 7, wherein the mandrel device comprises a plurality of cables (57) each electrically connected to a corresponding electromagnetic element of the plurality of attachment devices, wherein each cable comprises a cable portion being embedded in the corresponding mandrel element.

9. The mandrel device according to claim 1, wherein the mandrel device comprises a control unit in communication with the plurality of attachment devices and being configured for, in an attachment state, to cause the plurality of attachment devices to attach the mandrel elements to each other so as to bring the mandrel device in the assembled configuration, and configured for, in a detachment state, to cause the mandrel elements to detach from each other so as to bring the mandrel device in the detached configuration.

10. A method for manufacturing a hollow spar beam (30) for a segmented wind turbine blade (10) in a mould (100), the method comprising the steps of:

providing a mould for the hollow spar beam, the mould extending along a longitudinal axis and comprising a mould surface (101) including a floor face (103), a first side face (102), and a second side face (104);

providing a mandrel device (50) comprising:

a plurality of mandrel elements (52, 53, 54, 55, 56, 57, 58, 59) extending along the longitudinal axis and each comprising a substantially rigid material; and a plurality of attachment devices (60) configured for detachably attaching adjacent mandrel elements, wherein the mandrel device has an assembled configuration and a detached configuration, and:

in the assembled configuration, the plurality of attachment devices is engaged so that the plurality of mandrel elements is detachably attached to each other, and the plurality of mandrel elements extends along the longitudinal axis so that the mandrel device has a cross-section that varies along the longitudinal axis and surrounds an interior space (50*d*), and in the detached configuration, the plurality of attachment devices is disengaged so that the plurality of mandrel elements is detached from each other, and the plurality of mandrel elements is inwardly collapsible towards the interior space;

arranging fibre material (200) and optionally core material on the floor face and the side faces of the mould;

assembling the mandrel device to the assembled configuration by attaching the plurality of mandrel elements to each other via the plurality of attachment devices;

arranging the mandrel device on the fibre material in the mould so that the fibre material and optionally core material is arranged between the mandrel device and the mould;

covering the mandrel device with fibre material and optionally core material;

arranging the mandrel device in the detached configuration by detaching the plurality of mandrel elements from each other via the plurality of attachment devices; and withdrawing the detached plurality of mandrel elements from the mould.

11. The method according to claim 10, wherein the plurality of mandrel elements comprises or consists essentially of a fibre-reinforced plastic material.

12. The method according to claim 10, wherein the step of detaching the plurality of mandrel elements from each other is performed by operating a control unit to cause the plurality of attachment devices to detach so as to bring the mandrel device to its detached configuration.

13. The method according to claim 10, wherein the step of assembling the mandrel device to the assembled configuration is performed prior to the step of arranging the mandrel device on the fibre material in the mould.

14. The method according to claim 10, further comprising a step of arranging a mould lid on the mould so as to fully enclose the fibre material within the mould and mould lid.

* * * * *